United States Patent [19]

Taylor et al.

[11] 4,172,264
[45] Oct. 23, 1979

[54] CONTROL ARRANGEMENT FOR VIDEO SYNCHRONIZERS

[75] Inventors: Richard J. Taylor, Barnes; Peter C. Michael, Newbury, both of England

[73] Assignee: Quantel Limited, Berkshire, England

[21] Appl. No.: 873,037

[22] Filed: Jan. 27, 1978

[30] Foreign Application Priority Data

Feb. 1, 1977 [GB] United Kingdom ............... 3947/77

[51] Int. Cl.² .................................................. H04N 5/24
[52] U.S. Cl. ................................... 358/185; 358/183; 358/22
[58] Field of Search ............... 358/185, 183, 93, 22

[56] References Cited

U.S. PATENT DOCUMENTS

| | | | |
|---|---|---|---|
| 3,214,514 | 10/1965 | Schmid | 358/183 |
| 3,787,619 | 1/1974 | Wolff | 358/183 |
| 3,944,731 | 3/1976 | Busch | 358/183 |
| 4,011,401 | 3/1977 | Presti | 358/183 |
| 4,016,362 | 4/1977 | Bristow et al. | 358/183 |

Primary Examiner—Howard W. Britton
Assistant Examiner—Edward L. Coles
Attorney, Agent, or Firm—Dowell & Dowell

[57] ABSTRACT

A video control arrangement for a synchronizer includes a joystick for moving the T.V. picture in at least one plane to a first selected position. A memory arrangement receives and holds information on the location of the first preselected position which can be recalled later to effect automatic movement of the T.V. picture to this preselected position.

10 Claims, 5 Drawing Figures

CONTROL ARRANGEMENT FOR VIDEO SYNCHRONIZERS

BACKGROUND TO THE INVENTION

The invention relates to synchronisers and more specifically to a video control arrangement for synchronisers.

Framestore synchronisers (e.g. Quantel DFS 3000) are now well known in various parts of the television world for example North America and Europe (see also for example British patent application Ser. No. 6588/76 or U.S. patent application Ser. No. 769,615, now U.S. Pat. No. 4,101,939).

In the DFS 3000, the synchroniser has the facility of picture freeze within the frame store (see also for example British patent application Ser. No. 6585/76 or U.S. patent application Ser. No. 764,148). The facility of frame compression to produce quarter size pictures is provided (see also for example British patent application Ser. No. 21024/76 or U.S. patent application Ser. No. 798,513, now U.S. Pat. No. 4,152,799). Movement of the compressed picture may be effected by means of a joystick control.

OBJECT OF THE INVENTION

An object of the invention is to provide additional control facilities for the synchroniser which may be provided at a position remote from the synchroniser.

SUMMARY OF THE INVENTION

According to the invention there is provided a video control arrangement for a synchroniser comprising; positioning means for moving the position of a T.V. picture in at least one plane to a first selected position; memory means for receiving and holding information on the location of said first preselected position and for recalling the location of this preselected position.

BRIEF DESCRIPTION OF DRAWINGS

The invention will now be described by way of example with reference to the accompanying drawings in which.

DESCRIPTION OF PREFERRED EMBODIMENTS

Figure 1:
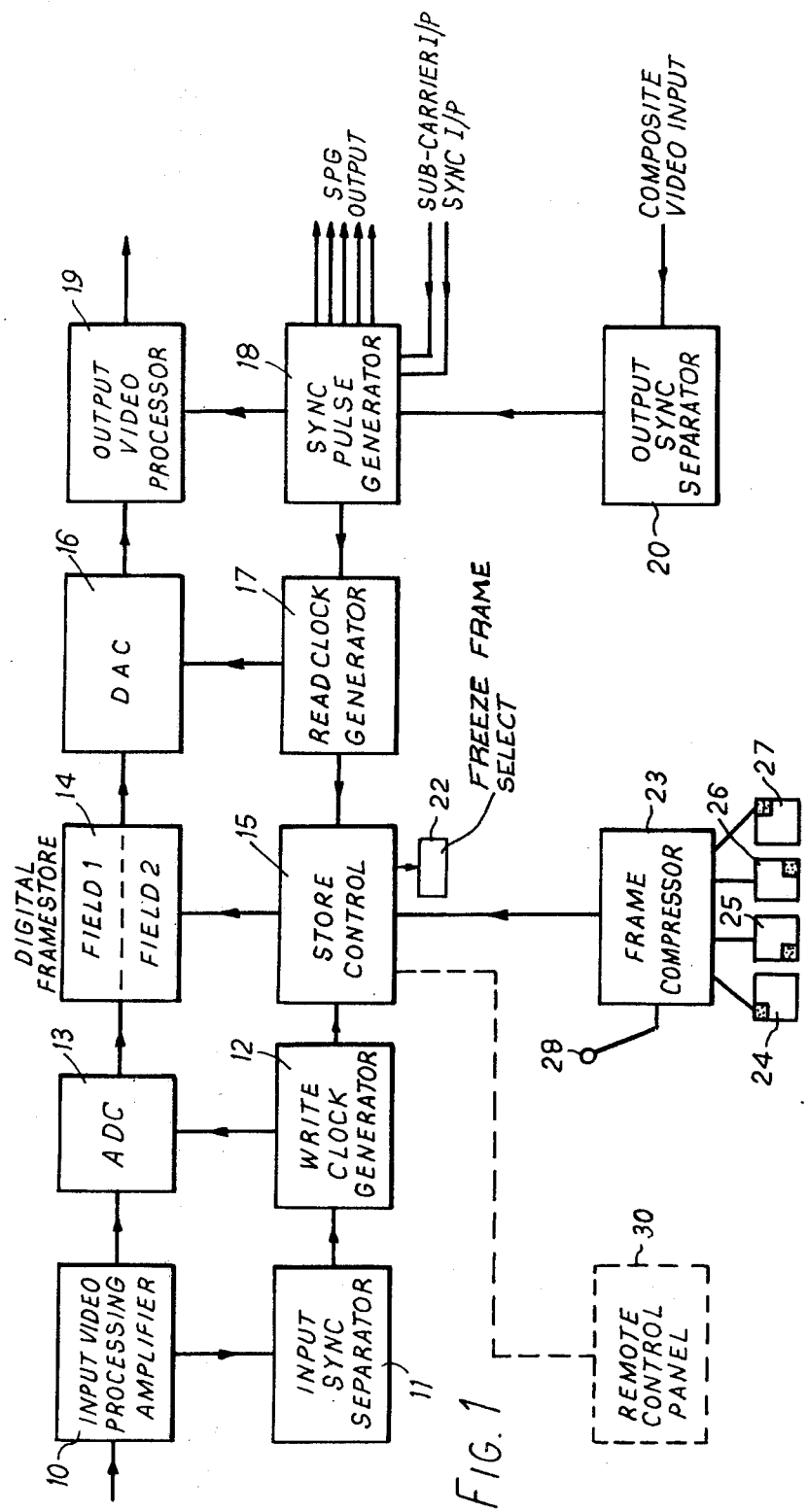
FIG. 1 shows the known synchroniser to which the control arrangement of the invention can be attached.

The arrangement for the known DFS 3000 synchroniser is shown in FIG. 1. A video input is received by processing amplifier 10 which feeds sync separator 11 controlling a write clock generator 12. The clock generator output is received by an analogue to digital converter (ADC) 13 which converts the video signal to digital form prior to storage in a frame store 14. The write clock generator 12 also has an output received by a store control 15 which controls the operation sequence of the store 14. The store output is received by digital to analogue converter 16 which is under the control of clocks from read clock generator 17 receiving sync pulses from sync pulse generator 18. The analogue output of converter 16 is received by output processor 19 which provides the composite video output of the synchroniser. The sync pulse generator 18 is controlled by means of externally generated sub carrier and sync inputs directly or via an output sync separator 20 which receives a composite video signal.

The store control of the synchroniser has the facility of freezing the picture within the frame store (see also for example British patent application Ser. No. 6585/76 or U.S. patent application Ser. No. 764,148). The synchroniser has the facility of frame compression by only storing selected picture point samples so that if every other picture point is not stored (in both horizontal and vertical directions) a quarter sized picture is produced (see also for example British patent application Ser. No. 21024/76 or U.S. patent application Ser. No. 795,513). The frame compressor 23 allows this compressed picture to be stored in any one of four quadrants by means of selectors 24-27 which control the picture point counter addresses. In addition a joystick control 28 is provided which allows the quarter size picture to be moved anywhere within the normal picture frame area by defining the pertinent varying address as the stick is moved.

The remote control arrangement 30 of the invention is connectable to the store control of the known synchroniser to provide the standard functions just described together with additional functions at a position remote from the synchroniser (e.g. in the studio mixer) by a distance of up to several hundred feet if required.

Figure 2:
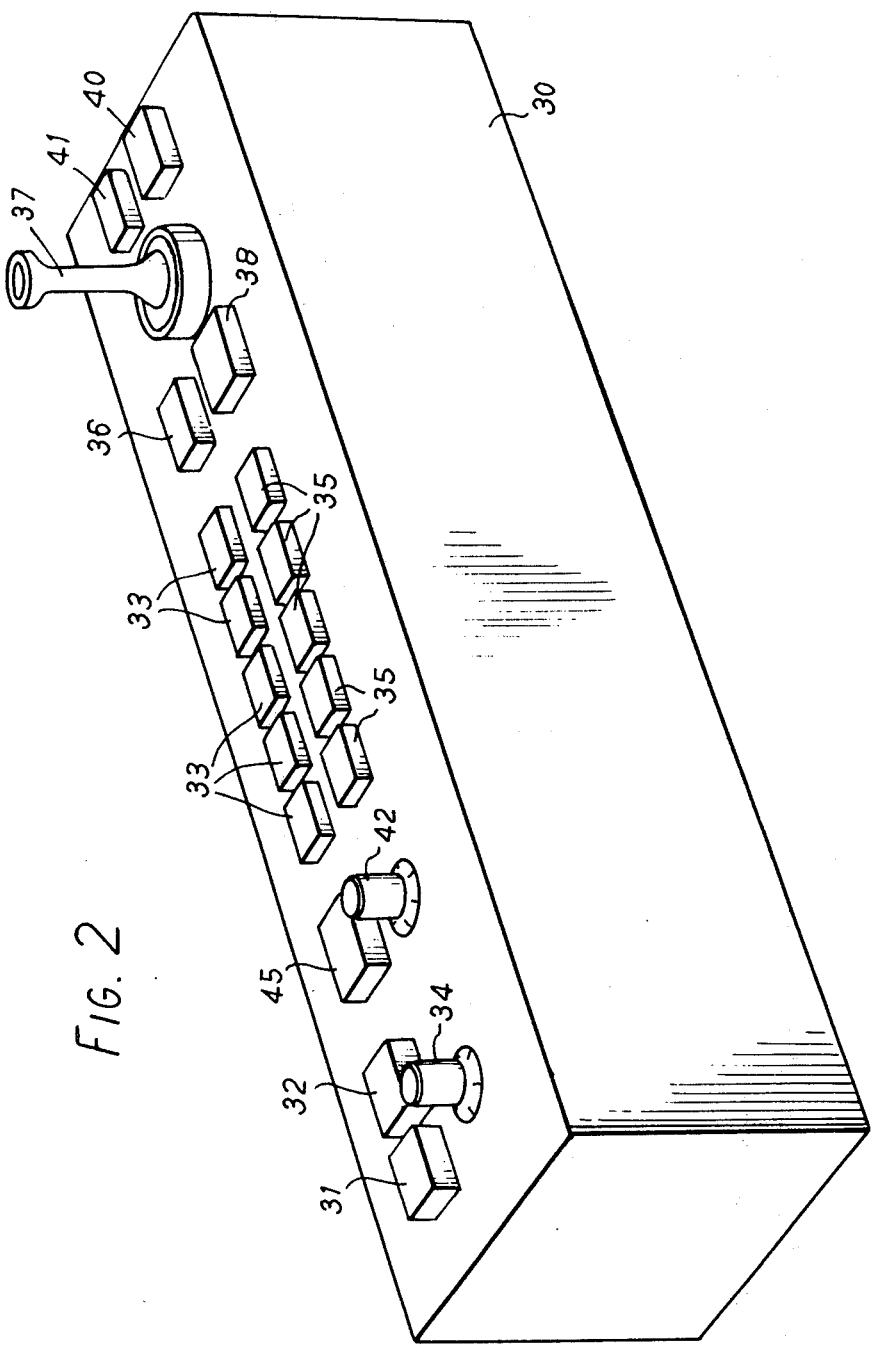
FIG. 2 shows typical manual controls of the unit.

A typical layout for the manual controls of unit 30 is shown if FIG. 2.

A frame freeze button 31 is provided for freezing captions. A field freeze button 32 is provided for stopping fast moving objects on the picture. In addition an update control 34 is provided which allows a variable update interval to be selected by the producer to automatically update the frozen picture between a rate of say once per second to infinity (i.e. hold).

Five preselect buttons 33 are provided for the compressed picture position. These buttons not only select the compressed function when depressed but also have the capability to memorize positions previously chosen at the beginning of the T.V. programme so that these can be recalled by the producer when required and thus allow rehearsal of a programme prior to transmission in the confidence that when he moves from event to event on air the chosen sequence will be faithfully reproduced. The chosen position is recalled merely by pressing the appropriate button and the cancellation of this effect to normal size and position is effected by depressing the appropriate button once again.

The memory facility is actuated during rehearsal in conjunction with 'live' button 36 and joystick positioner 37. The picture position is determined by varying the joystick 37 with live button 36 depressed. If one of the preselect buttons 33 is also depressed the position of the joystick is remembered for recall later.

It is also possible to move and memorise a full frame of video by means of joystick 37 by depressing live button 38 and one of the five preset buttons 35 in a similar way to compressed frame. By only depressing the live button 36 or 38 it is possible to rely only on live position control without using the preselect facilities of buttons 33 and 35. Two buttons 40 and 41 are provided to switch off respectively the X and Y axes of the joystick to allow a smooth live single dimentional pan or tilt.

A transition time control 42 is provided to allow the producer to select the rate of pan or tilt from one preselected position to another. The rate can be varied typically from instantaneous to a time of several seconds. Alternatively the rate of velocity may be varied.

An auto key button 45 is also provided. The auto key facility is provided to make life easier for the camera man. The control is able to measure the centre of the chroma key area when the chroma key signal is fed into the synchroniser and computes the appropriate position for the compressed image to be centred over the key signal so that if the camera pans the compressed image automatically follows. Thus auto key is used where a chroma key signal is being fed to the synchroniser and the producer has approximately centred a compressed picture over the key area using one of the five preselector buttons. Pressing the auto key button 45 will ensure that the compressed image is automatically centred over the key area even if this key area should move. The various buttons described above may incorporate a lamp to clearly indicate that a button is depressed.

Figure 3:
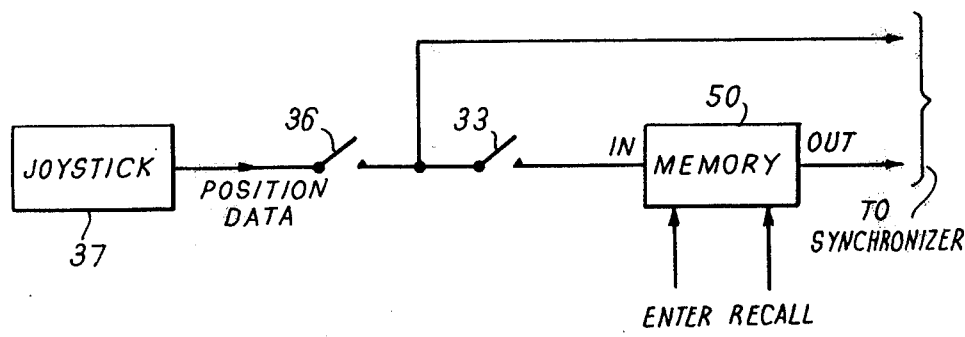
FIG. 3 shows one arrangement for presetting and recalling the image position in the control arrangement of the invention.

A circuit arrangement suitable for the compressed picture position presetting of FIG. 2 is shown in FIG. 3.

The position data from joystick control 37 can be passed via live switch 36 directly to the synchroniser so that the joystick operates in the known live mode. If however the preset switch 33 is closed, the position data is fed into a memory 50 where it is stored. When the position data is recalled this is passed to the synchroniser to cause movement to this position to be implemented. Enter and recall for the memory can be arranged to be actuated respectively with the preset switch 33. The memory may be analogue or digital depending on the type of output provided by the joystick and the synchroniser input. To provide the requirements of the FIG. 2 arrangement five such switches 33 and memories 50 would be required for the compressed picture position and five similar arrangements for the full frame position.

Although such a system can be constructed solely from known hardware elements it is more convenient to use a microprocessor system with related circuitry to effect the above arrangements and such a system will be described later with reference to FIG. 5.

Figure 4:
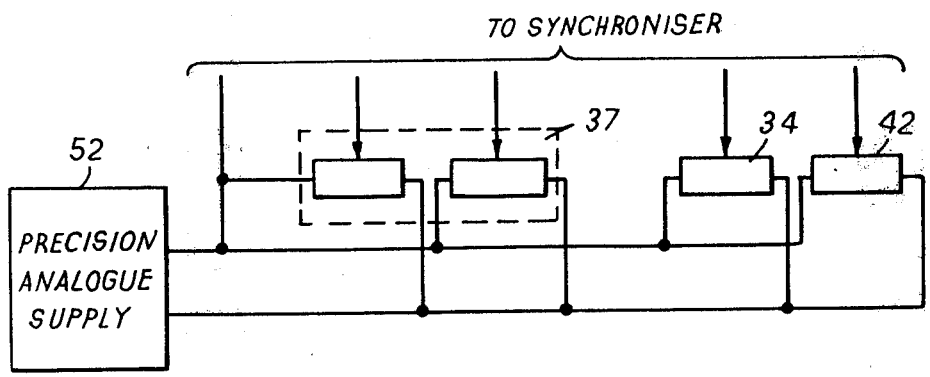
FIG. 4 shows the joystick, undate interval and transition time controls.

FIG. 4 shows analogue arrangements for the joystick, update intervals and transition time controls.

Joystick control 37 comprises two variable resistors one for vertical and horizontal position respectively. Update interval control 34 comprises one variable resistor which controls a simple timing circuit (not shown) that operates on the freeze lines. The transition time or velocity control 42 also comprises a variable resistor and this operates a simple ramp circuit (not shown) that constrains the rate at which the voltage that controls the position is allowed to change from one location to another. The controls receive a voltage from a precision analogue supply 52 which may be in the control unit or taken from the synchroniser.

Figure 5:
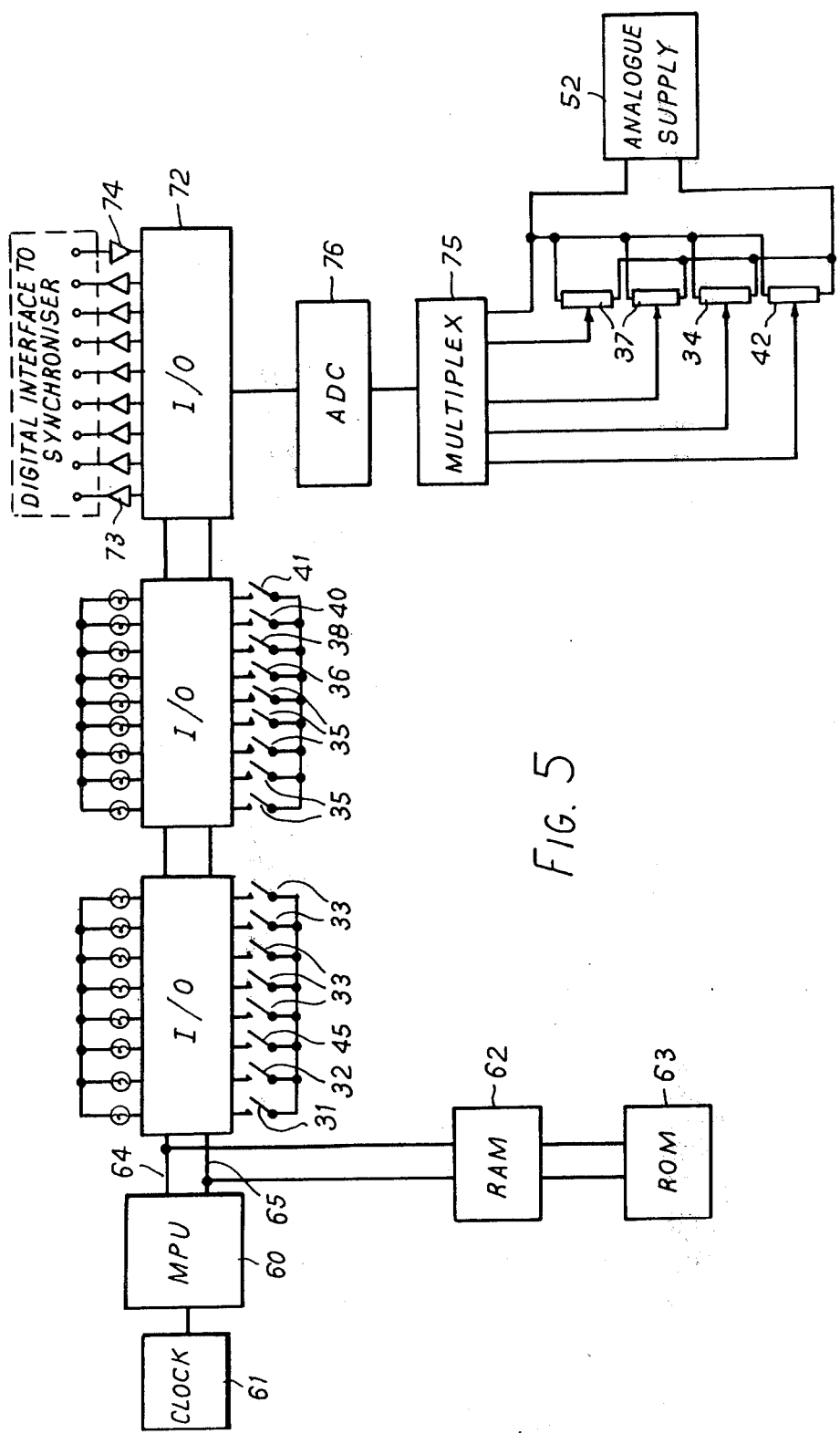
FIG. 5 shows an arrangement including a microprocessor for realising the functions of the FIG. 2 arrangement.

The use of a microprocessor system to effect the above control functions is shown in FIG. 5. The heart of the system is a microprocessor unit (MPU) 60 (e.g. Motorola 6800). A random access memory (RAM) 62 (e.g. Motorola 6810) is connected to the MPU which acts as working space for the programme, which processor programme is contained in read only memory (ROM) 63 (e.g. Motorola 6830). The memories are connected to the MPU by common address bus 64 and common data bus 65. The various switches 31, 32, 45, 33, 36, 35, 38 (and their associated lamps) are connected to I/O circuits 68, 69 (peripheral interface adaptors e.g. type 6820). These interface adaptors are connected to the MPU via common buses 64, 65. An additional adaptor 72 is provided together with line drivers 73 and line receivers 74 to provide the necessary digital interfacing to and from the synchroniser.

The analog controls of FIG. 4 are now included in FIG. 5 and are connected to the microprocessor system via a multiplexer 75 and an analogue to digital converter (ADC) 76 which converts the analogue signal to digital form to allow purely digital interfacing to and from the synchroniser of all required functions.

The programming of microprocessors is well known and so will not be described in detail.

The microprocessor programme is written in such a way that the pushing of the relevent selector button and moving the joystick effects memorising of that location for the compressed or full frame picture to allow the picture to move from one position to another at a rate chosen by the variable transition control.

Another advantage of the microprocessor system is that the programme can be written in such a manner that non-linear movement of the picture from one stored location to another is possible. In this way picture movement similar to that achieved by the camera man when having to accelerate and decelerate the mass of his camera can be obtained thereby creating greater realism.

The variable transition control is achieved by causing the programme to incrementally count from one location to another. Clearly if this count is fed as the address of the picture to the synchroniser, smooth movement between, instead of an instantanious jump from one location to another, is obtained. The concept of non-linear movement can be realised by producing a non-linear transfer function in the programme space so that linear vectors demanded by the main programme are 'bent' to move slower at the start and finish of the process.

We claim:

1. A video control arrangement for a synchroniser comprising:
   picture positioning means for moving the relative frame position of a T.V. picture to a first selected position;
   memory means for receiving and holding information on the location of said first preselected position and for recalling the location of this preselected position.

2. A control arrangement according to claim 1 wherein said memory means is for holding information on a full size picture.

3. A control arrangement according to claim 1 wherein said memory means is for holding information on a compressed picture.

4. A control arrangement according to claim 1 wherein auto key means are provided to ensure automatic centering of the position of the T.V. image.

5. A control arrangement according to claim 1 wherein the control arrangement can be provided remote from the synchroniser via coupling means.

6. A control arrangement according to claim 1, wherein a plurality of memory means are provided to receive and hold information on a plurality of preselected positions.

7. A control arrangement according to claim 6 wherein transition means are provided to effect movement of said picture from one preselected position to another in a predetermined period.

8. A control arrangement according to claim 7 wherein said transition means are variable to provide movement over a predetermined period range.

9. A control arrangement according to claim 1 wherein freeze control means are provided to freeze the picture for a predetermined period and wherein update means are provided to update the frozen picture after a predetermined period.

10. A control arrangement according to claim 9 wherein the update means is variable to provide a variable update period.

* * * * *